United States Patent

[11] 3,557,777

[72] Inventor David Cohen
 5801 South Dorchester, Chicago, Ill. 60637
[21] Appl. No. 636,071
[22] Filed May 4, 1967
[45] Patented Jan. 26, 1971

[54] MAGNETIC STUDY OF BIOELECTRIC PHENOMENA
 28 Claims, 12 Drawing Figs.
[52] U.S. Cl.................................................. 128/2,
 128/2.1; 174/35; 324/43
[51] Int. Cl....................................................... A61b 5/10,
 H05k 9/00; G01r 33/02
[50] Field of Search............................................128/2, 2.05,
 2.06, 2.1

[56] References Cited
 UNITED STATES PATENTS
1,882,402 10/1932 Kruse............................ 128/2.06
1,888,139 11/1932 Nichols......................... 128/2.06X
2,150,223 3/1939 Hollmann...................... 128/2.06
2,366,799 1/1945 Luisada......................... 128/2.06X
3,228,030 1/1966 Moore........................... 128/2.1X FOREIGN PATENTS
641,507 2/1937 Germany.................... 128/2.06

Primary Examiner—Delbert B. Lowe
Attorney—Le Blanc and Shur

ABSTRACT: An apparatus and method for magnetic detection of bioelectric activity associated with muscle action or with other living tissue. The system comprises a magnetic shielding facility for establishing an enclosed region within which the ambient level of magnetic noise is below the level of the magnetic fields to be measured and a highly sensitive magnetic field detector positioned within the enclosed space. Also included are adjustable chair means for comfortably supporting a subject to be studied, and suitable electronic signal processing circuitry connected to the magnetic field detector for producing a visual display of the magnetic fields measured.

The magnetic field detector is arranged to produce an electrical indication of a component of the magnetic field in a relatively localized region of space, so that a direct mapping of the magnetic fields associated with the bioelectric activity being studied may be made by measurement of a single magnetic field component at a plurality of locations.

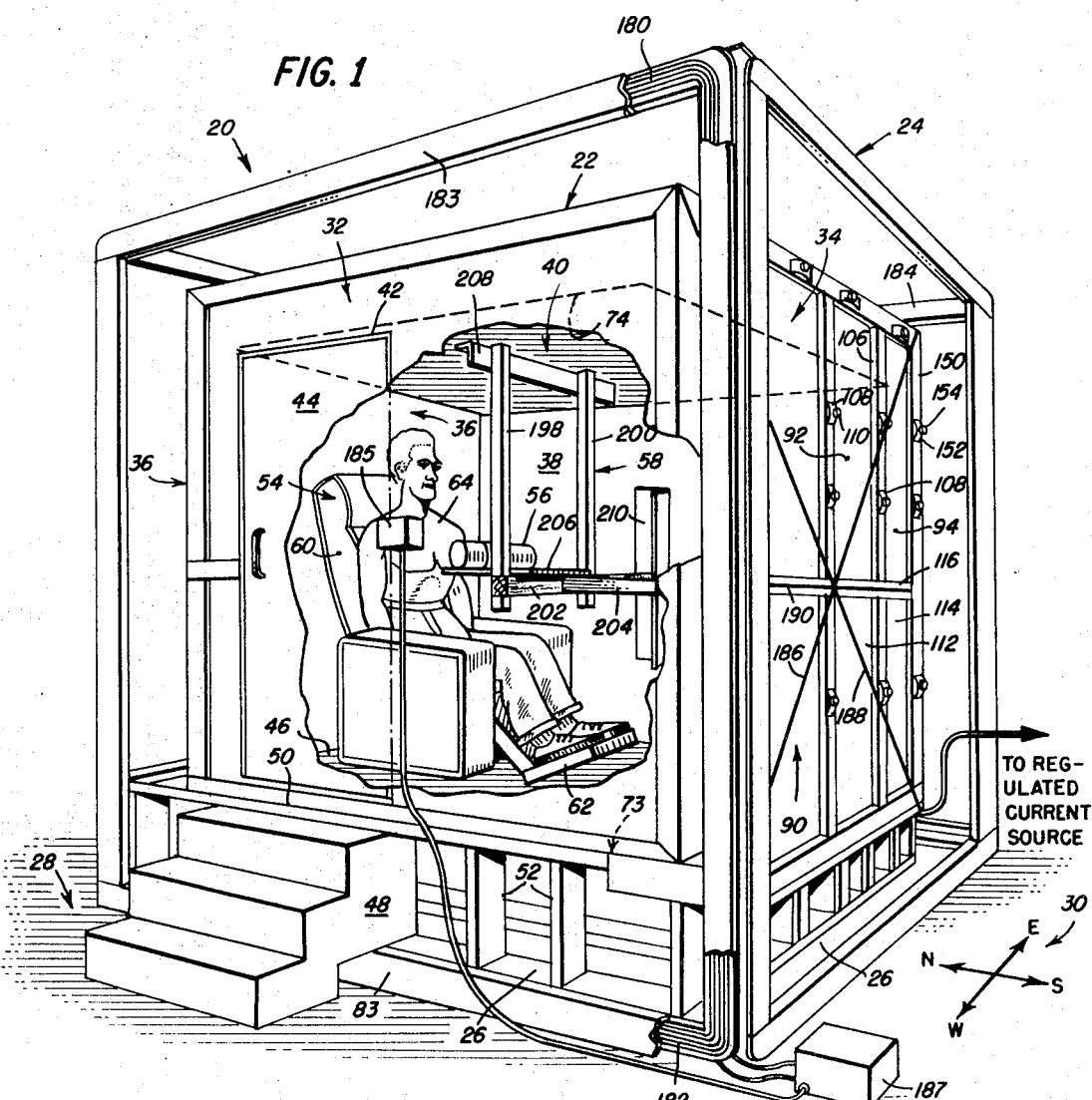
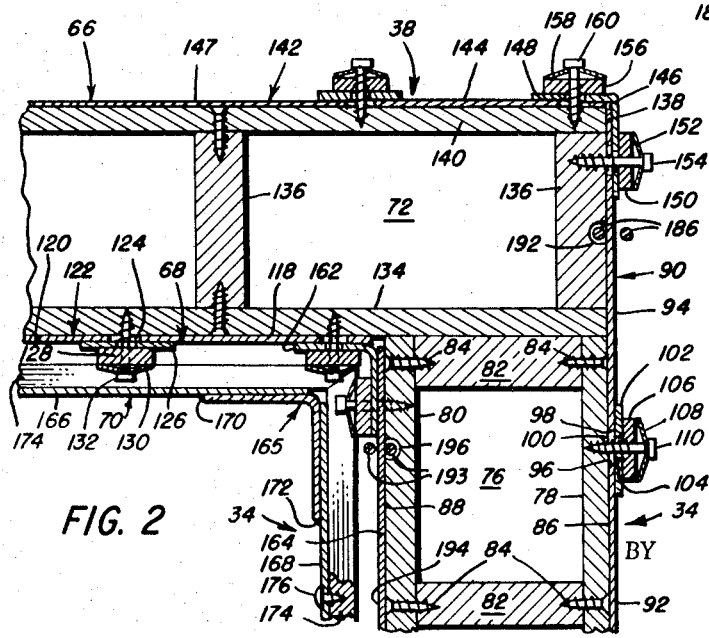
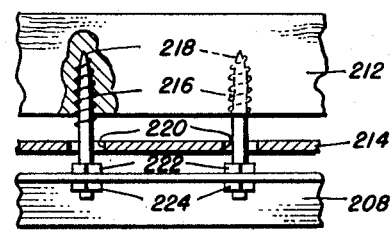
INVENTOR
DAVID COHEN
ATTORNEY

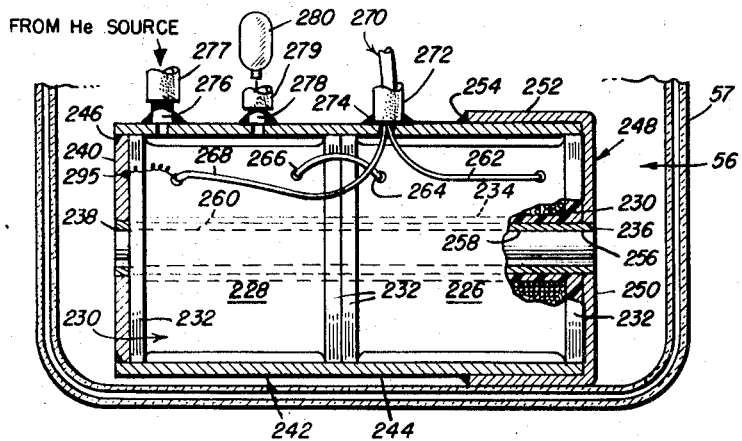
FIG. 4
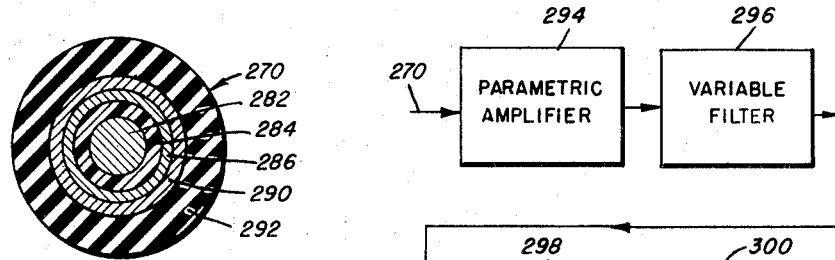
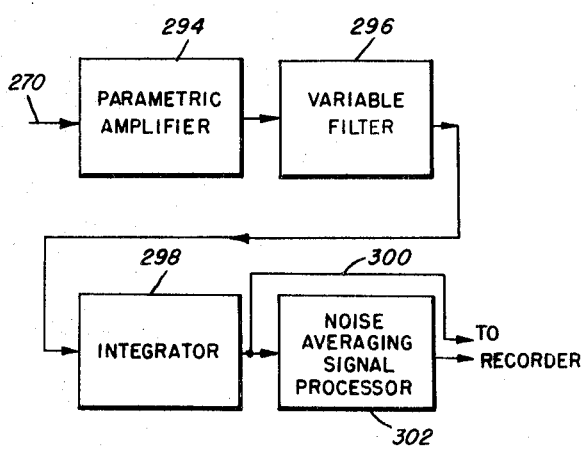
FIG. 6
FIG. 5
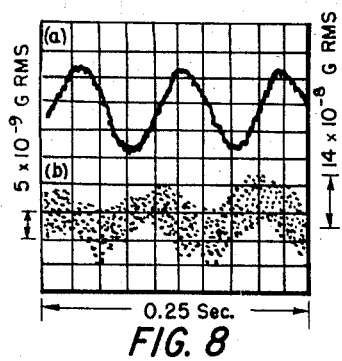
FIG. 8
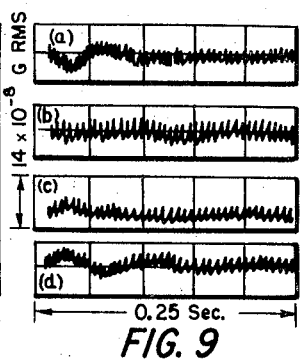
FIG. 9
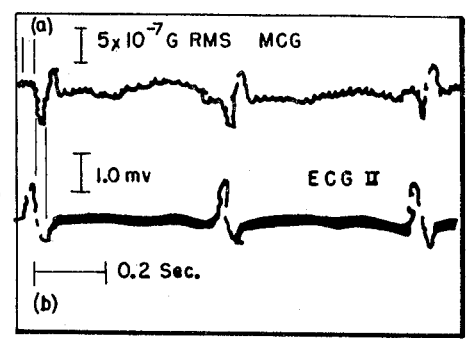
FIG. 7
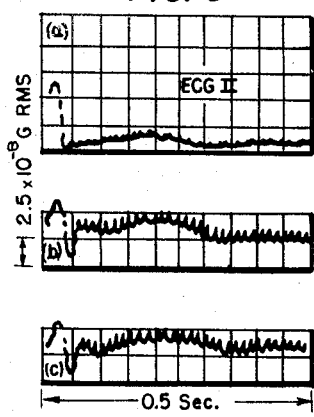
FIG. 10
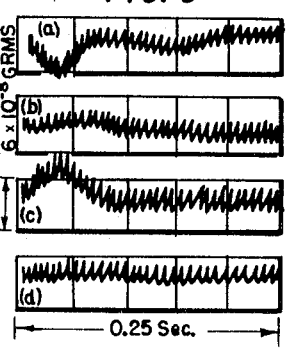
FIG. 11
INVENTOR
DAVID COHEN
BY
Le Blanc & Shur
ATTORNEY

MAGNETIC STUDY OF BIOELECTRIC PHENOMENA

This invention relates to magnetic study of biological phenomena and more particularly to a system and technique for studying the electric currents flowing in living tissue by direct mapping of magnetic fields associated with such currents. The invention is particularly useful in the study of magnetic phenomena associated with the heart or other living muscular tissue. Such study might be termed "magnetomiography" with regard to muscle studies generally, and "magnetocardiography" in connection with study of the heart.

The existence of electrical activity associated with living tissue has been recognized for some years, and several techniques exist for exploiting this phenomenon. For example, diagnosis of heart disease is commonly aided by the measurement of electric potentials on the torso in the region of the heart, a technique known as electrocardiography. Electrical study of other muscular tissue, e.g., by insertion of potential measuring probes directly into the muscle to be observed, often serves to monitor the healing process after muscle repair. This is generally referred to as electromiography.

While the foregoing techniques are of considerable utility, it has been suggested that the study of magnetic, as well as electric, activity could yield worthwhile complementary information. The electric potential commonly measured is a scalar quantity while the current flow itself is a vector quantity. On the other hand, the magnetic fields associated with the currents are themselves vector quantities. Thus, magnetic field measurement offers an opportunity for more accurate assessment and consequent better understanding of the currents flowing in human tissue.

Accordingly, several attempts have been made to locate and measure magnetic fields associated with living tissue. However, considerable difficulty has been encountered, primarily due to the very small magnitude of the fields in relation to the high ambient fields due to the magnetic field of the earth itself, as well as to various manmade magnetic noises. By way of example, it has been calculated that at a distance of 10 cm. from the torso, the magnetic fields, due to the biocurrents in the heart, are of the order of between $10^{-7}$ and $10^{-8}$ Gauss RMS, over a range of about 0—30 Hz. Detectors are available which are capable of measuring such small fields; however, ambient fields on the order of $10^{-4}$ Gauss RMS completely mask the field to be measured. Thus, various noise elimination techniques have been suggested.

One such technique has been referred to as gradient detection. This involves measurement of the difference in the magnetic induction (the B vector) at closely spaced points over the area in which the magnetic field is to be mapped. It is assumed that the ambient magnetic disturbances are substantially constant over the short distances involved; thus, the difference between the noise fields at the two closely spaced points is approximately zero. Correspondingly, the noise contribution to the gradient detector output is substantially zero.

However, gradient detection is inherently a derivative process whereby the signal output of the detector must be spatially integrated to recover the B vector itself. While graphical or other techniques are available for accomplishing such space integration, it is subject to an extremely rapid buildup of errors, as well as to considerable loss of spatial resolution.

As an alternative, a direct technique involving field measurement at a succession of single points has previously been considered. However, success of such an approach requires facility for reducing the ambient magnetic noise level below the level of the phenomenon being investigated since the single point measurement does not provide the noise cancellation of the gradient technique. On the other hand, direct measurement has the advantage of avoiding the error inducing space integration needed with gradient detection. Notwithstanding its potential advantages, direct measurement has been rejected by several workers in this field as infeasible due to magnetic noise shielding problems.

In contrast to the above, I have now found that it is possible to provide an economically and technically satisfactory magnetic shielding enclosure of large size whereby direct magnetic detection of bioelectric activity can be accomplished. Thus, it is now possible to provide a magnetic complement to previously employed electric detection techniques, without resort to space integration of the measured fields. Moreover, the magnetic detection technique offers the advantage of decreased patient discomfort since the magnetic detection instruments are preferably disposed in spaced relationship to the area of the body being observed, while presently employed techniques require direct contact of the detectors with the body surface or even insertion of the detector probes into the muscles being observed.

Briefly, in accordance with my invention, there is provided an extremely sensitive detector of relatively high spatial resolution, and associated apparatus including low noise electric signal processing equipment and a magnetically quiet enclosure of novel and advanced design. The detector is positioned within the enclosure and is rigidly mounted to reduce or eliminate magnetic noise due to detector vibration. The subject or patient is movably supported in relation to the detector, and measurements are made of the field components over the entire portion of the body of interest, notwithstanding unavoidable high ambient magnetic noise. In addition, the detector is constructed to permit its immersion in liquid nitrogen to further reduce noise limitations on system operation.

Accordingly, by employment of the shielded enclosure and magnetic detection apparatus of this invention, as well as the techniques described below, there are provided a method and means for exploring the advantageous possibilities of direct magnetic investigation of bioelectric activity, contrary to the expectations of others in the art.

Accordingly, it is a general object of my invention to provide an improved apparatus and method for studying electrical activity of living tissue.

Also, it is an object of my invention to provide a system for mapping the magnetic fields associated with biocurrents flowing in living tissue.

It is a more specific object of my invention to provide an apparatus and method for supplementing known diagnostic techniques of electrocardiography and electromiography by providing analogous magnetic techniques of magnetocardiography and magnetomiography.

It is an additional object of my invention to provide a diagnostic complement to the techniques of electrocardiography and electromiography employing direct magnetic field measurement notwithstanding high levels of ambient magnetic disturbances.

It is a further object of my invention to provide a bioelectric diagnostic apparatus including a magnetic field detector and a large shielded enclosure.

It is also an object of my invention to provide diagnostic apparatus having a highly sensitive magnetic field detector providing relatively high spatial resolution, and being capable of measuring magnetic fields having a magnitude on the order of $10^{-8}$ Gauss RMS or below.

It is a still further object of my invention to provide diagnostic apparatus including a magnetic shielding facility for reducing the effects of ambient magnetic disturbances to a level below that of the signals to be measured which are on the order of $10^{-8}$ Gauss.

It is yet a further general object of my invention to provide a large scale magnetic shielding facility capable of reducing the ambient magnetic fields therewithin to below about $10^{-8}$ Gauss.

It is an additional object of my invention to provide a large scale magnetically quiet enclosure comprising a plurality of concentric shielding layers and having the magnetic properties thereof substantially enhanced above those normally expected.

It is also an object of my invention to provide a magnetic shielding facility as described above wherein the shielding enhancement is achieved by modification of the magnetic properties of certain of the shielding layers comprising the structure.

The exact nature of this invention, as well as other objects and advantages thereof, will be apparent from consideration of the following detailed description and the accompanying drawings wherein:

FIG. 1 is a perspective view, partially cut away, illustrating the significant features of a particular embodiment of my invention;

FIG. 2 is an enlarged sectional view of a portion of FIG. 1 showing a suitable wall construction for the shielded enclosure in accordance with my invention;

FIG. 3 is an enlarged partially sectional view of a portion of a preferred suspension arrangement for the magnetic detector of my invention;

FIG. 4 is a cross-sectional view showing the internal features of the magnetic field detector;

FIG. 5 is a schematic block diagram showing a suitable arrangement for the electronic processing circuitry associated with the magnetic field detector of FIG. 4;

FIG. 6 is a cross-sectional view of a preferred construction for the electrical cable connecting the apparatus of FIGS. 4 and 5, especially useful when the magnetic detector is immersed in liquid nitrogen during operation;

FIG. 7 is a visual comparison between a magnetocardiogram obtained under especially favorable conditions and a standard electrocardiogram;

FIG. 8 shows a typical noise calibration for the system of this invention;

Figure 12:
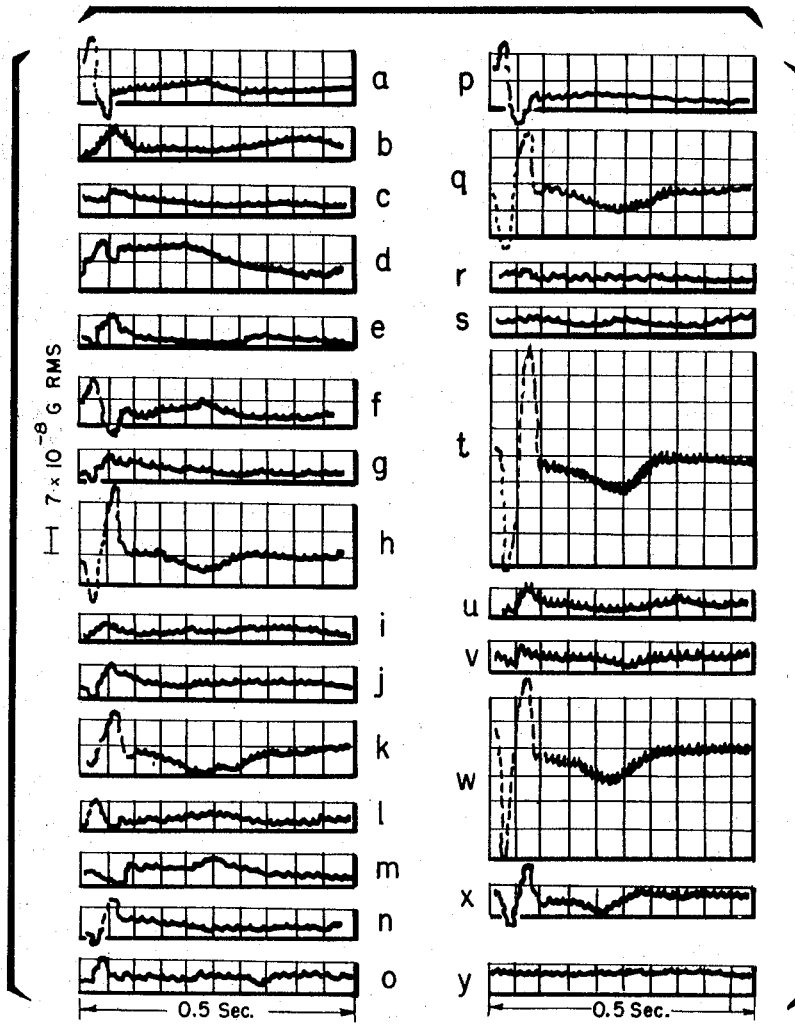

FIGS. 9—11 show various magnetocardiograms illustrative of the properties of my system; and FIGS. 12a—12y show a mapping of magnetic heart activity in a typical human subject.

With reference to FIG. 1, the overall magnetic facility of the present invention, indicated at 20, comprises a shielded enclosure 22 and a surrounding cubical framework 24. Enclosure 22 is comprised of a plurality of concentric cubical shells, described in detail below, supported on a subflooring 26 of wood, or other nonmagnetic material. Subflooring 26, in turn, rests on a supporting surface 28 which may be a floor of the building in which enclosure 22 is located.

For convenient description, enclosure 22 is oriented in FIG. 1 relative to a compass rose 30 in the lower right-hand corner of the FIG. Thus, the front wall 32 is the west wall, while right sidewall 34 is the south wall. Similarly, the left sidewall 36 and backwall 38 (only the interiors of which are visible in FIG. 1) are the north and east walls, respectively. However, it should be understood that the orientation shown is arbitrary and can be varied if desired. By way of example, it may prove advantageous to build the shielded enclosure 22 into a room utilizing one or more of the preexisting room walls in the shielded structure. Under such circumstances, an orientation other than the one illustrated may be necessary. similarly, the magnetic environment may dictate some other orientation, as amplified below.

Referring still to FIG. 1, access to the interior 40 of enclosure 22 is provided by means of a doorway 42 in enclosure west wall 32. A door 44 is movably mounted in doorway 42 and is constructed of a plurality of shielding layers, each arranged to align with one of the respective cubical shells forming the shielded enclosure itself when the door is closed. This provides uninterrupted magnetic shielding in the region of doorway 42.

As will be appreciated, the interior space 40 is actually defined by the interior surfaces of the innermost shell forming enclosure 22. Thus, the floor level 46 of interior 40 may be some distance above the level of subflooring 26, and correspondingly, a greater distance above the level of supporting surface 28. Thus, a stairway 48, and a landing 50, supported by a plurality of spaced vertical joists 52, are provided between supporting surface 28 and doorway 42.

Located within interior 40 are a chair 54, a magnetic detector 56, and suitable detector suspension apparatus 58. Chair 54 is preferably formed of plastic or other nonmagnetic material and may include an adjustable back portion 60 and a leg rest 62 to permit a subject or patient 64 to be comfortably supported in the desired position relative to detector 56. In addition, chair 54 is preferably movable, e.g., on casters, to further facilitate accurate placement of the subject relative to the detector.

The construction and arrangement of the concentric cubical shells forming enclosure 22 will best be understood from reference to FIGS. 1 and 2, the latter of which is a horizontal sectional view illustrating the wall construction in the southeast corner of the enclosure. Basically, the embodiment illustrated comprises an external shell 66, an intermediate shell 68, and an internal shell 70, each having six sides formed of the required type of shielding material to define the sides, top, and bottom of the particular shell. Each side may, in turn, be formed of a plurality of small sheets of stock material secured together and supported by a wooden inner structure 72 in a manner described more fully below. Exterior shell 66 and intermediate shell 68 are preferably formed of an extremely high magnetic permeability alloy such as 4-97 molypermalloy, while internal shell 70 is preferably formed of a low permeability, high conductivity material such as aluminum or copper.

As shown in FIG. 2, wooden inner structure 72 includes six separate wall members, each corresponding to one of the closure sidewalls 32, 34, 36, and 38, to bottom wall 73 and to top wall 74 (see FIG. 1). By way of example, the wall member 76 within enclosure south wall 34 comprises a pair of vertical backing panels 78 and 80, formed of a nonmagnetic material such as ¾-inch plywood or the like. Panels 78 and 80 are rigidly secured on opposite sides of a plurality of spaced joists 82 extending vertically upward in perpendicular relationship to subflooring 26 by a means such as a plurality of brass wood screws 84. Joists 82 are preferably about 2 inches thick and about 8½ inches wide to assure structural rigidity and to provide a substantial spacing, i.e., approximately 10 inches, between opposite external faces 86 and 88 of backing panels 78 and 80.

A like construction is employed in each of the other wall members, although it should be appreciated that suitable modification of the structure is necessary to accommodate doorway 42 and associated door 44. The six wall members are preferably prefabricated as described above prior to the application of the shielding material and assembly to form enclosure 22.

The layers of shielding material actually forming the sides of the concentric shells are preferably applied in the form of small sheets as previously mentioned. The required number of sheets are attached directly to the ¾-inch backing panels. By way of example, the south sides 90 of exterior shell 66 and intermediate shell 68 are attached to faces 86 and 88, respectively, of backing panels 78 and 80. Due to the need for extremely efficient magnetic shielding, the joint between adjacent sheets must be constructed to maintain a high level of magnetic continuity between the sheets. A preferred joint construction is illustrated in detail in FIGS. 1 and 2. With reference to south wall 34, the south side 90 of shell 66 is comprised of a plurality of separate sheets of shielding material such as adjacent sheets 92 and 94. As illustrated in FIG. 2, sheets 92 and 94 are placed on backing panel 78 with their adjacent edges 96 and 98 slightly spaced to form a small gap 100. A vertical connecting strip 102, formed of the same material as sheets 92 and 94, is placed over gap 100. Connecting strip 102 is predrilled with a series of small vertically spaced holes such as 104 and is so located that holes 104 overlie gap 100. A thin wooden slat 106 is positioned over connecting strip 102, parallel to gap 100. Finally, a plurality of resilient clips 108, formed of aluminum or other nonmagnetic material, are placed on wooden slat 106 over each of holes 104 in connecting strip 102. A brass screw 110 passes through each of clips 108, wooden slat 106, hole 104 and gap 100 into backing panel 78, to complete the joint assembly. By the action of resilient clip 108 and screw 110, a substantial pressure is applied to connecting strip 102 whereby magnetic continuity is maintained between sheets 92 and 94, with little or no reluctance across gap 100. As will be appreciated, a similar horizontal joint is provided between sheet 92 and a vertically aligned sheet 112, and between sheet 94 and a vertically aligned sheet 114 (see FIG. 1), said joint including a wood slat 116 and a plurality of clips identical to 108 (omitted from FIG. 1 to show the remaining structure more clearly). As will be appreciated each joint is secured by a sufficient number of clips to assure rigid attachment of the sheets to backing panel 78 and to maintain effective magnetic continuity.

A like construction is employed on all six sides of external shell 66, and also on the walls of intermediate shell 68. By way of example, two adjacent sheets 118 and 120 in the east wall 122 of intermediate shell 68 are connected at a gap 124 by means of a connecting strip 126, a wooden slat 128, a resilient clip 130, and a screw 132, the latter being anchored in a plywood backing panel 134, similar to panels 78 and 80.

At the corners between adjacent walls, a slightly different construction is employed. As shown in FIG. 2, sheet 94 of outer shell 66 extends over the outermost one of a series of vertical joists 136 and the edge 138 of an outer backing panel 140 comprising east wall member 142. A sheet 144 of the shielding material forming the east side 147 of external shell 66 extends along backing panel 140 whereby there remains a small gap 146 separating sheet 144 from south sidewall sheet 94. Overlying gap 146 is a vertically elongated angle member 148 which serves to provide magnetic continuity between the adjacent sides of shell 66. Angle member 148 is formed of the same material as sheets 94 and 144 and is connected thereto by means of the arrangement previously described, including a vertical wooden slat 150, a resilient clip member 152, and a brass screw 154 on south side 90, and a wooden slat 156, a clip 158, and a screw 160 on the east side 147.

With continued reference to FIG. 2, an identical construction, including an angle member 162, is employed to connect the previously mentioned sheet 118 in the east wall of intermediate shell 68 to a like sheet 164 in the south wall of intermediate shell 68. The bottom and top walls 73 and 74 are of the same construction, though it will be appreciated that the ends of the various angle members should be appropriately mitered, i.e., at 45°, to assure accurate assembly.

The six sides of internal shell 70 are each formed of one or more sheets of the required material welded together or otherwise connected at each joint to assure electric continuity over the entire joint. As illustrated in FIG. 2, the corners of inner shell 70 are formed by a plurality of angle members such as angle 165, connecting east wall sheet 166 and south wall sheet 168, welded along the entire length of the joints at 170 and 172 respectively.

Interior shell 70 is supported on a plurality of wooden slats 174, secured to the wood slats 128 overlying the joints between the component sheets of intermediate shell 68. Slats 174 are of sufficient thickness to isolate interior shell 70 from the hardware employed in the intermediate shell joints, e.g., the resilient clips 130 and screws 132. The component sheets of inner shell 70 are secured to slats 174 by means of wood screws such as 176, at sufficiently frequent intervals to assure structural rigidity. In addition, a wooden subflooring of any convenient type may be provided below internal shell 70, if necessary, to provide adequate support for chair 54 and seated subject 64 within the interior 40 of enclosure 22.

The shielded facility provided by the above described construction is quite effective in reducing the ambient magnetic disturbances unavoidably present, especially the static disturbances due to the earth's magnetic field, and under certain circumstances may provide a sufficiently magnetically quiet environment for practice of my invention. However, in the presence of significant manmade magnetic disturbances, especially of higher frequencies, it has been found that further shielding should be provided. This may be accomplished by two different techniques.

First, additional ambient field attenuation may be obtained by generation of a carefully controlled bucking field oriented to combine with and substantially cancel at least one predetermined ambient field component.

Accordingly, supported in any convenient fashion by external cubical framework 24 (see FIG. 1) is at least one coil of copper wire 180, e.g., standard No. 22 wire. This may be accomplished in any suitable manner, as by construction of framework 24 in laminar form with an interior conduit or space 182 for receiving coil 180. Coils such as 180 may be provided in each of the six faces of cubical frame 24 so that any selected component of the ambient magnetic disturbance may be canceled. This permits alignment of the magnetic axis of detector 56 in any desired direction within enclosure 22. However, for purposes of discussion, it may be assumed that detector 56 is fixedly mounted within enclosure 22 in the east-west direction so that elimination of only the east-west component of the ambient magnetic field is essential. Under such circumstances, it is necessary that coils 180 be provided only in the west face 183 and in the east face 184 of framework 24.

Commercially available magnetic field detector means, e.g., a fluxgate magnetometer 185, are located outside of enclosure 22 and positioned with the sensitive axis lying in the east-west direction, preferably at the center of the east or west wall. The magnetometer output is connected as a control input to a suitable current source 187, the output of which is connected to the ends of bucking coils 180. The instantaneous direction of the current flowing through coils 180 is arranged so that the magnetic field induced is 180° out of phase with that measured by the magnetometer while the instantaneous current level is adjusted so that the magnitude of the induced field is substantially equal to the instantaneous magnitude of the ambient field. Since the vector direction of the induced field is opposite to that of the E-W ambient field component, a substantial degree of cancellation can be achieved.

A second quiet effective way of attenuating the ambient field within enclosure 22 results from my discovery of shielding enhancement due to the presence of a time varying B field within external shell 66 and intermediate shell 68. I have found that AC shielding enhancement of this type can produce a reduction by a factor of about 10 in the level of the ambient magnetic field within enclosure 22.

A preferred arrangement for achieving such enhancement is to couple an external time-varying magnetic field to the desired shells by means of a series of toroidal windings surrounding the walls of each shell. With regard to the south side 90 of external shell 66, a first wire 186 extends diagonally upward from the bottom of the west end to the top of the east end. A second wire 188 extends diagonally upward from the bottom of the east end to the top of the west end. A third wire 190 extends horizontally in the east-west direction overlying supporting slat 116.

Each of wires 186, 188 and 190 continues behind the layer of shielding material as shown in FIG. 2. For example, wire 186 extends diagonally downward from the top of the east end to the bottom of the west end in a groove 192 cut into the outer surfaces of joist 136 and backing panels 134 and 78. Similar grooves are provided for the extensions of each of wires 188 and 190.

Wires 186, 188, and 190 are connected in series so that for a given phase of current passing through the three wires, the direction of the resultant B field is vertically upward.

A like set of three wires is provided in each of the top and bottom sides and in the north side of exterior shell 66; no wires need be provided in the east and west sides. The wires are arranged in the manner previously described; one portion of each wire overlying the outer surface of the sheets of shielding material, and continuing behind the sheets of shielding material through a groove cut in the wooden backing. The 12 wires are all connected in series so that for an upward B field in the south side, there is a northward B field in the top, a downward B field in the north side, and a southward B field in the bottom.

A substantially identical construction is employed to couple the required magnetic field to intermediate cube 68.

For example, a first wire 193 extends diagonally upward from west to east, overlying the inner surface 194 of the sheets of shielding material. As before, the wire extends around to the opposite side of the shielding material, and extends diagonally downward from east to west through a groove 196 in backing panel 80. A second wire (not shown) extends diagonally downward from west to east, and a third wire (also not visible) extends horizontally in the east-west direction. Nine additional wires (three wires associated with each of the top, bottom, and north sides of intermediate shell 68) complete the 12-turn circuit. The windings are connected in the same manner as those associated with exterior shell 66 so that the resulting B fields are constantly in phase for both shells.

The ends of each of the 12-turn coils are connected to any suitable regulated current source to provide a time-varying current. One satisfactory arrangement is to utilize available 60 Hz. power in combination with suitable phase and amplitude regulation. Excellent results are achieved using between about 3 and 4 amps RMS through each coil. Under such conditions, standard No. 22 wire may be employed, although heavier wire, e.g., No. 16 wire, is preferable to prevent undue heating.

The use of shielded enclosure 22 and the additional ambient field attenuation provided by bucking coils 180 and by the AC enhancement produces an extremely quiet magnetic environment. Thus, direct detection and mapping of the magnetic fields associated with heart and other muscle action are made possible, notwithstanding the fact that such magnetic fields are several orders of magnitude smaller than the ambient magnetic fields normally encountered. It should, however, be recognized that while the particular shield enclosure construction set forth above is preferred, other arrangements providing sufficient ambient field attenuation may be utilized within the scope of this invention.

Associated with the foregoing are the magnetic detection apparatus and related electronic signal processing equipment now to be described in detail.

Magnetic field detector 56 is preferably of the induction type, i.e., its electric output is proportional to the time derivative of the magnetic flux. Under such conditions, the detector is preferably rigidly mounted within enclosed space 40 to reduce or eliminate noise pickup due to time variation of flux passing through the detector as a result of detector vibration in low level static fields. A suitable rigid suspension 58 is shown in detail in FIGS. 1 and 3.

Suspension 58 comprises four heavy wooden beams 198, 200, 202 and 204 (e.g., 4×4's) and an attached supporting shelf 206 Beams 198 and 200 extend vertically downward from an elongated aluminum angle member 208 attached to the top side 74 of enclosure 22. Wooden beam 202 extends horizontally in the east-west direction from an aluminum angle member 210 vertically mounted on enclosure east wall 38, while wooden beam 204 extends horizontally in the north-south direction from enclosure south wall 34 and is attached to an angle member (not shown) of the same type as angle members 208 and 210.

Horizontal beam 202 is restrained against vertical vibration by beams 198 and 200 and against horizontal vibration by horizontal beam 204. Supporting shelf 206 is attached to horizontal beam 202 and serves as a rigid platform for magnetic field detector 56.

The manner in which the aluminum angle members are secured to the structure of shielded enclosure 22 is shown in FIG. 3. The particular construction shown is that of upper angle member 208 viewed from the north side. As illustrated, angle member 208 is directly secured to a horizontal joist 212 forming a wooden inner member of top side 74. In the interest of clarity, several features of the top side cross section, including the various shielding layers comprising external shell 66 and intermediate shell 68 have been omitted from the drawing. A portion 214 of internal shell 70 is visible in FIG. 3, and will be understood to be supported by a plurality of wooden slats in the manner previously described.

The angle member 208 is supported by means of a plurality of aluminum rods 216, including threaded portions 218, extending upwardly a substantial distance into joist 212. Each of aluminum rods 216 extends upward through an aperture 220 cut in inner shell layer 214. Apertures 220 are preferably approximately 1½ inches in diameter, while rods 216 are preferably no more than about 1 inch in diameter.

The lower ends of each of rods 216 are threaded to receive a pair of nuts 222 and 224. Nuts 222 are positioned at the tops of the lower threaded portions of rods 216 and serve as standoffs to prevent contact of angle member 208 with internal shell layer 214. Angle member 208 is received below nuts 222 on rods 216 and secured in place by means of lower nuts 224.

As will be appreciated, a like construction is employed in the mounting of angle member 210 and of the unillustrated additional angle member supporting north-south beam 204. The particular construction employed is necessary to provide maximum rigidity since the relatively thin layer 214 may be subject to considerable vibration. Were angle member 208 in contact with layer 214, such vibration could be transferred through the angle member and the attached wooden beams to the detector. It should be understood, however, that any other construction providing adequate vibration isolation between suspension 58 and enclosure inner shell 70, may be used.

The actual construction of a suitable magnetic field detector 56 in accordance with my invention may best be understood from consideration of FIGS. 4 through 6. In FIG. 4 is shown a cross-sectional view of the detector itself. An induction type detector is preferred due to its potential high sensitivity, good spatial resolution, and relatively simple construction. As amplified below, the detector is constructed so that ti may be operated while immersed in liquid nitrogen to reduce sensitivity limitations due to inherent detector noise.

In this regard, when low temperature operation is desired, detector 56 may be placed in a thermally insulated container; e.g., an appropriately shaped Dewar flask 57 partially filled with liquid nitrogen in which the detector is immersed. Electrical and pneumatic connections to detector 56 are made in the manner described below by low temperature resistant materials to prevent liquid nitrogen infiltration into the detector itself.

As illustrated, detector 56 comprises two multiturn coils 226 and 228, each wound on like plastic coil forms 230. Coil forms 230 are constructed of a commercially available fluorocarbon polymer such as TEFLON or of nylon, about one-eighth inch in thickness. The TEFLON material is preferred due to its lower coefficient of thermal expansion. Also, when detector 56 is operated in liquid nitrogen, it has been found that nylon coil forms tend to cause noise, apparently due to electrostatic polarization, while the TEFLON material does not, whereby a higher sensitivity detector may be obtained with the latter.

Coil forms 230 each include a pair of end pieces 232 and a connecting tubular central portion 234. The coil forms are series stacked on a one-half inch I.D., 20 mil thickness brass tube 236. Brass tube 236 is hard soldered at the left-hand end in an aperture 238 in a circular brass disc 240, which forms one end of a cylindrical electrostatic shield 242. Shield 242 further includes an elongated cylindrical portion 244 hard soldered to disc 240 at 246 and a cylindrical end cap 248 including a circular disc portion 250 and a further enlarged cylindrical portion 252. End cap 248 is semipermanently secured over cylindrical portion 244 of shield 242, as by a soft solder bead 254.

Hollow brass tube 236 extends outwardly through an aperture 256 in end plate 250 and provides a straight-through passage 258 from one end of shield 242 to the other which is isolated from the interior of the shield. Passage 258 serves to receive a cylindrical ferrite rod 260 which may be used if desired to further increase the sensitivity of the detector. However, it will be appreciated that employment of ferrite rod 260 may involve some loss of spatial resolution due to the unavoidable field disturbance which it causes.

Referring still to FIG. 4, coils 226 and 228 are connected in series so that the voltage induced by a given flux variation will be of like phase in both coils. Thus, one end 262 of coil 226 serves as the detector output while the other end 264 is connected to one end 266 of detector coil 228. The other end 268 of detector coil 228 serves as the ground output for detector 56. Coil ends 262 and 268 are connected to a coaxial cable 270 described more fully below extending outwardly through a brass chimney 272 hard soldered at 274 to cylindrical portion 244 of shield 242.

To prevent flexing of detector 56 due to variation of internal air pressure, a pair of gas fittings 276 and 278 are secured to cylindrical wall 244. Fitting 276 is connected by means such as a TEFLON tube 277 and a suitable regulating valve to a source of gaseous helium, while fitting 278 is connected by a similar TEFLON tube 279 to an accumulator chamber 280. The latter may be an elastic balloon of suitable material. In addition to preventing contraction, the flow of gaseous helium through electrostatic shield 242 provides a slight positive pressure which prevents leakage into the detector of liquid nitrogen through any incompletely sealed joints in the shield, usually present at cryogenic temperatures.

Detector coils 226 and 228 are each preferably formed of several hundred thousand turns of extremely fine copper wire. For room temperature operation, it is found that extremely satisfactory results are achieved if each coil is formed of approximately 200,000 turns of No. 41 copper wire. For operation in liquid nitrogen, i.e., at a temperature of minus 196° C., each detector coil is preferably formed of approximately 400,000 turns of No. 44 copper wire. The larger number of turns results in a higher sensitivity for the detector. This is feasible when the detector is immersed in liquid nitrogen due to the reduction in the inherent resistance noise of the coil itself. This is the so-called "Johnson" noise which is proportional to the product of the square root of the coil temperature and its resistance. Since both of these factors are reduced by reduction of the detector operating temperature it is found that the inherent coil noise can be reduced by a factor of 6 when the detector is immersed in liquid nitrogen. Even greater reduction in inherent coil noise can be achieved if the detector is immersed in liquid helium, though use of the latter presents handling difficulties not encountered with liquid nitrogen.

Due to the extremely high sensitivity required, it is important that all sources of external noise can be reduced or eliminated. Thus, it has been found that a specially designed coaxial cable 270 should be employed, especially when detector 56 is immersed in liquid nitrogen. A schematic diagram of a suitable coaxial conductor 270 is shown in FIG. 6.

As illustrated, conductor 270 is a multilayer coaxial cable. The core 282 is a very thin copper conductor serving as the signal bearing lead. The adjacent layer 284 is an insulating layer of TEFLON, with radial thickness not exceeding one-sixteenth inch. Layer 286 should be a relatively thin tight tube of semiconductor material serving as a noise suppression layer. The next layer 290 is a metallic braid which serves as the return conductor for the cable. Finally, outer layer 292 is preferably a relatively thick neoprene casing capable of withstanding the extreme low temperature of liquid nitrogen.

Internal metallic conductor 282 is preferably a thin copper strand and should be at least a standard No. 30 wire or larger. A copper-clad iron wire of standard No. 30 size may also be employed; however, this presents an additional difficulty since the iron core must be demagnetized after being brought into shielded enclosure 22 and not thereafter removed. Use of the nonmagnetic solid copper core wire 282 obviates this difficulty.

Referring now to FIG. 5, there is shown a schematic diagram of a suitable arrangement of electronic processing circuitry for use with detector 56. As illustrated, the detector output is provided over wire 282 and braid 290 of coaxial cable 270 to a low noise parametric amplifier 294. Braid 290 is also soldered to the interior of brass casing 242 to provide a ground connection 295. The output of parametric amplifier 294 is connected to an adjustable band pass filter 296 which in turn is connected to the input of suitable integrating circuitry 298. The output of integrator 298 may be directly connected by means of a lead 300 to a suitable recorder, such as an oscilloscope or a strip chart recorder, and may also be connected as the input to a noise averaging signal processor, such as the Nuclear Data Enhancetron.

Parametric amplifier 294 is preferably of any commercially available type, such as the Texas Instrument Model RA3 or any equivalent device having an input noise level substantially below that of the signal to be measured. Such amplifiers are frequently highly microphonic, and best results are obtained if the amplifier is rigidly mounted, e.g., directly on detector suspension 58 (see FIG. 1). This also permits use of a relatively short length of coaxial cable 270, with resulting lower noise pickup.

Variable filter 296 should be a variable band pass adjustable filter as indicated, having a frequency range between zero and about 40 Hz. Integrator 298 is necessary since induction detector 56 inherently provides a signal proportional to the time derivative of the magnetic field being measured rather than its actual value. Any suitable integration circuit, e.g., a capacitive feedback-operational amplifier, may be employed.

The noise averaging signal processor 302 is preferably not used during operation in liquid nitrogen since the inherent noise levels of the system are sufficiently low under those conditions so that signal averaging is not necessary. In that case, it will be appreciated that the integrator output is provided directly over lead 300 to the recording apparatus. When used, however, processor 302 should provide a time average over a time period which is large compared to the time period of actual measurement, e.g., satisfactory results are obtained when the signal is averaged over at least 100 to 150 measurement periods.

The operating characteristics of the system as well as the results of its use will best be understood from reference to FIGS. 7 through 12. The data shown are representative of the operation of the preferred system embodiment described above. Specifically, shielded enclosure 22 is formed with exterior shell 66 and intermediate shell 68 having each wall formed of six sheets of 4–79 molypermalloy each having a thickness of 0.06 inch. Internal layer 70 is formed of six sheets of 1100 aluminum having a thickness of three-sixteenth inch. The enclosed space 40 provided within shell 70 is approximately 86 inches by 88 inches by 88 inches while the outer dimensions of enclosure 22 are each approximately 9 feet. Framework 24 which supports bucking coils 180 is approximately 12 feet on each side. All measurements were obtained using a detector such as described in connection with FIG. 4 having two coils of 200,000 turns of No. 41 copper wire encased in a brass electrostatic shield about 4½ inches long and about 3½ inches in diameter. All data was obtained at room temperature with the detector 56 mounted on supporting platform 206 and aligned in the east-west direction at the center of enclosed space 40.

With reference now to FIG. 7a, there is shown a typical output signal appearing on lead 300, i.e., without noise averaging. FIG. 7b shows a electrocardiogram for the same subject. The data was obtained by positioning the subject with the detector approximately 10 cm. from the right nipple with the subject facing in the east direction. FIG. 7a represents the response of a favorable subject, although considerable noise is present in the signal compared to the present in the electrocardiogram of FIG. 7b. The noise is attributable in part to a high 60 cycle level and in part to random coil noise. Here, appropriate adjustment of the variable filter 296 has provided a substantial reduction in the 60 cycle noise level which might otherwise have been present. As may be seen from FIG. 7, there is a substantial correlation between the normal component of the measured magnetic field and the electric potential indicated by the electrocardiogram.

FIG. 8 is representative of a calibration of the detector system described above. FIG. 8a represents the magnetic field generated by a calibrating loop; the waveform shows the actual calibrating loop current. FIG. 8b shows the detector response; this is very near the inherent noise level. In this case, the waveform of FIG. 8c is produced by noise averager 302.

FIGS. 9 through 12 show various magnetocardiograph characteristics. In all instances, detector 56 was oriented as shown in FIG. 1 with the coil axis lying in an east-west direction on shelf 206. The subject was seated on the west side of the detector with the detector axis normal to the torso. Noise averager 302 was employed; the waveforms represent an average of about 150 periods of display time. In FIG. 9a, the detector was located 20 centimeters from the torso, 10 centimeters below the left nipple. FIG. 9b shows a measurement at the identical location, except that a magnetic shield was placed over the detector. Waveforms 9c and 9d show the magnetic fields detected at a distance of 20 centimeters from the back of the subject, 10 centimeters below the right and left nipples, respectively.

In FIG. 10a is shown an electrocardiogram for a particular subject. In FIG. 10b is shown the magnetic field measured at a distance of 15 centimeters from the left nipple. FIG. 10c is at the same location with a copper shield placed around detector 56. The waveforms are substantially identical indicating the lack of any significant electric field effect in the detector output.

Waveforms 11a and 11(b) were taken with the detector at 20 centimeters from the left nipple, the latter waveform being obtained with a magnetic shield surrounding the detector. FIG. 11c shows the magnetic field at a distance of 20 centimeters away from the upper right-hand portion of the back, while FIG. 11d shows the substantial falloff of the magnetic field at distances in excess of 70 centimeters.

Finally, FIGS. 12a through 12y show an extensive mapping of the magnetic fields around the chest of a particular subject. The waveforms show various components at 10 different positions around the torso as set forth in the following chart, in which the small letters in the "Waveform" column correspond to the designations in FIG. 12. In the "Location" column, the small letters represent the following positions relative to a rectangular grid placed over the chest: (a) upper right-hand corner; (b) upper center; (c) upper left-hand corner; (d) right of right nipple; (e) midway between nipples; (f) left of left nipple; (g), (h), (i), approximately 7 centimeters below points (d),(e),(f), respectively; (j) approximately 7 centimeters below location (g); (k) approximately 7 centimeters away from chest. Waveforms obtained at locations (a) through (j) were taken at approximately 10 centimeters from the chest wall. In the "Component" column, the letters N, H and V denote the B field components pointing normally at the chest, horizontally from left to right, and vertically upward, respectively.

TABLE I.—MAGNETOCARDIOGRAPHIC MAPPING OF TYPICAL SUBJECT

| Waveform: | Location | Component |
|---|---|---|
| a | (1) | |
| b | a | N |
| c | a | H |
| d | b | N |
| e | b | H |
| f | c | N |
| g | c | H |
| h | d | N |
| i | d | H |
| j | e | N |
| k | e | H |
| l | e | V |
| m | f | N |
| n | f | H |
| o | f | V |
| p | (1) | |
| q | g | N |
| r | g | H |
| s | g | V |
| t | h | N |
| u | h | H |
| v | h | V |
| w | i | N |
| x | j | N |
| y | k | N |

[1] Reference electrocardiogram.

From the above, it may be seen that substantial correlation exists between the electrocardiogram and the magnetocardiogram waveforms taken at various points. Significantly however, distinct waveform changes are found to occur in the magnetocardiographic map at various locations relative to the subject's chest. These variations may be closely correlated with the vector nature of the magnetic field; therefore considerable information may be obtained about the related flow of the electric currents.

At the same time, it should be recognized that due to its inherently low noise, and its magnetically quiet environment, the present system is capable of achieving considerable spatial resolution, whereby magnetic detection of the electric activity in a localized area of muscle tissue may be possible without the need for insertion of detector probes into the muscle itself. Other diagnostic uses of the present invention, for example, magnetic study of electric activity of the brain which might be termed magnetoencephalography, may also be achieved.

The invention may be embodied in other specific forms without departing from the spirit or essential characteristics thereof. The present embodiment is therefore to be considered in all respects as illustrative and not restrictive.

I claim:

1. A method of studying bioelectric activity in a living subject comprising the steps of: introducing said living subject into an area in which the ambient level of magnetic noise is less than about $10^{-7}$ to $10^{-8}$ Gauss RMS, introducing a magnetic field detector into said area, positioning said detector in closely spaced relationship to a predetermined portion of the subject to be studied, obtaining a detector output representative of the value of the magnetic field component within the frequency range 1—30 Hz. at a single location in relation to said subject, and visually displaying said detector output signal.

2. A method of studying bioelectric activity as set forth in claim 1 further including the steps of positioning said detector at a succession of locations in relation to said subject, obtaining detector output signals representative of the value of magnetic field components at each of said succession of locations, and visually displaying said detector output signals.

3. A method of studying bioelectric activity as defined in claim 1 wherein said step of obtaining said detector output comprises measuring an electric potential representative of the time derivative of the magnetic flux associated with said magnetic field component, and obtaining the time integral of said potential.

4. Apparatus for detection of magnetic phenomena associated with bioelectric activity in a living subject comprising: means for establishing a magnetically quiet area having an ambient level of magnetic noise of less than about $10^{-7}$ to $10^{-8}$ Gauss RMS; magnetic field detector means, said detector means providing an output signal representative of the level of a magnetic field component in one localized region of space; means adapted for adjustably supporting a living subject in relation to said detector; and electrical signal processing means connected to said detector for visually displaying said detector output signal.

5. Apparatus for detection of magnetic phenomena as set forth in claim 4 wherein said detector is characterized by an inherent noise output corresponding to a magnetic noise level comparable to or below the ambient magnetic noise level in said area.

6. A method of studying bioelectric activity as set forth in claim 1 further including immersing said detector into a cool environment to reduce its operating temperature to about minus 196° C. or less.

7. A method of studying bioelectric activity as set forth in claim 1 wherein said step of obtaining a detector output comprises maintaining said detector at approximately room temperature, measuring an electric potential representative of said magnetic field component, and obtaining a time average of said potential over a period which is large in comparison to the period of bioelectric activity being measured.

8. A method of studying bioelectric activity as defined in claim 1 including the steps of enclosing said detector in an electrostatic shield, and establishing a slight positive pressure within said shield by introducing gas therein under pressure slightly above atmospheric pressure.

9. A method of studying bioelectric activity as defined in claim 8 including the step of immersing said electrostatically shielded detector in liquid nitrogen, said positive pressure within said shield serving to prevent infiltration of the liquid nitrogen and direct contact thereof with the magnetic field detector.

10. Apparatus as defined in claim 4 wherein the means for establishing said quiet area comprises an enclosure having a plurality of concentric shells of magnetic shielding material, at least one of said shells being characterized by high magnetic permeability, and at least another of said shells by low magnetic permeability and high electric conductivity.

11. Apparatus as defined in claim 10 including means for coupling an alternating magnetic field into the one of said shells characterized by high magnetic permeability.

12. Apparatus as defined in claim 11 wherein said coupling means comprises a coil of wire positioned in close proximity to said high magnetic permeability shell, an alternating current source coupled to said coil, and means for controlling said current to establish the desired magnetic field in said shell.

13. Apparatus as defined in claim 4 wherein said means for establishing said quiet area comprises an enclosure having three concentric shells of shielding material, the outer two of said shells being formed of a material characterized by high magnetic permeability, means for establishing a controlled alternating magnetic field in each of said outer two shells, the innermost of said three shells being formed of a material characterized by a low magnetic permeability and high electric conductivity, and being electrically isolated from said outer two shells.

14. Apparatus as defined in claim 13, wherein said outer two shells are formed of 4-79 molypermalloy, and wherein said innermost shell is formed of a material selected from the group consisting of aluminum and copper.

15. Apparatus as defined in claim 4, wherein said means for establishing said quiet area comprises an enclosure having a plurality of concentric shells formed of relatively thin layers of shielding material separated by an interior framework of nonmagnetic material, said quiet area being defined by the interior of the innermost of said shells, and including means within said area for rigidly supporting said detector means to isolate said detector means from any mechanical vibration which may exist within said area.

16. Apparatus as defined in claim 15 wherein said means for supporting said detector comprises suspension means directly attached to said interior framework, and mechanically isolated from the layers forming the inner one of said shells of shielding material.

17. Apparatus as defined in claim 4 wherein said detector means comprises means for providing an electrical potential proportional to the time derivative of the magnetic flux associated with the magnetic field to be measured.

18. Apparatus as defined in claim 4 wherein said detector comprises at least one coil having a plurality of turns of wire, a coil form comprised of plastic material receiving said coil, an electrostatic shield encasing said coil, and cable means connecting said coil to said electrical signal processing means.

19. Apparatus as defined in claim 18 including means for establishing a positive pressure in said electrostatic shield slightly in excess of atmospheric pressure.

20. Apparatus as defined in claim 19 including a source of gas under pressure, inlet means connecting said source of gas to the interior of said electrostatic shield, outlet means, and accumulator means connected to said outlet means to maintain the interior of said electrostatic shield at the desired positive pressure.

21. Apparatus as defined in claim 18 wherein said coil form is comprised of a material selected from the group consisting of "TEFLON" and nylon.

22. Apparatus as defined in claim 18 wherein said detector is comprised of two coils of fine copper wire connected in series, each coil having at least about 200,000 turns of copper wire, said wire being of the thickness of standard No. 41 wire or less.

23. Apparatus as defined in claim 18 further including thermally insulating means for receiving said detector and said electrostatic shield, said thermally insulating means being adapted to establish an operating temperature for said detector of approximately minus 196° C. or less.

24. Apparatus as defined in claim 18 wherein said cable means is comprised of a metallic signal conductor and a metallic return conductor, said conductors being insulated by an intervening adjacent "TEFLON" layer, and further including at least one layer of semiconductive noise suppressing material between said signal conductor and said return conductor.

25. Apparatus as defined in claim 18 wherein said electrostatic shield comprises a cylindrical brass chamber having two circular end plates and a circular body, and a brass tube connecting said end plates and extending through aligned apertures therein, said detector being positioned within said shielded chamber on said brass tube.

26. Apparatus as defined in claim 4 wherein said means for supporting said subject comprises an adjustable chair formed of substantially nonmagnetic material.

27. Apparatus as defined in claim 4 wherein said signal processing means comprises a parametric amplifier connected to the output of said magnetic field detector, variable band pass filter means connected to the output of said parametric amplifier, means for producing the time integral of the output of said band pass filter, and means connecting said integrator means to a recorder.

28. Apparatus as defined in claim 27 wherein said electrical signal processing means further includes a noise averaging signal processor connected to the output of said integrator means for generating the average value of said integrator output over a predetermined period of time.